(12) United States Patent
Rapp et al.

(10) Patent No.: US 7,899,295 B2
(45) Date of Patent: Mar. 1, 2011

(54) FIBER OPTIC MODULE

(75) Inventors: David E. Rapp, Eden Prairie, MN (US); Kristofer Bolster, Jordan, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 147 days.

(21) Appl. No.: 12/138,197

(22) Filed: Jun. 12, 2008

(65) Prior Publication Data
US 2009/0041417 A1 Feb. 12, 2009

Related U.S. Application Data

(60) Provisional application No. 60/944,016, filed on Jun. 14, 2007.

(51) Int. Cl.
G02B 6/00 (2006.01)
G02B 6/36 (2006.01)

(52) U.S. Cl. .................... 385/135; 385/14; 385/53; 385/88; 385/129

(58) Field of Classification Search ............ 385/14, 385/88–89, 92, 129, 134–135
See application file for complete search history.

(56) References Cited

U.S. PATENT DOCUMENTS

| 5,432,875 | A | 7/1995 | Korkowski et al. |
| 6,208,796 | B1* | 3/2001 | Williams Vigliaturo ..... 385/135 |
| 2003/0198427 | A1 | 10/2003 | Bragg et al. |
| 2004/0008946 | A1* | 1/2004 | Jung et al. ................. 385/45 |
| 2006/0165366 | A1 | 7/2006 | Feustel et al. |
| 2006/0269204 | A1* | 11/2006 | Barth et al. ................ 385/135 |
| 2007/0003190 | A1* | 1/2007 | Saravanos et al. ........... 385/49 |

FOREIGN PATENT DOCUMENTS

| EP | 1 152 630 A1 | 11/2001 |
| EP | 1 380 862 A2 | 1/2004 |
| WO | WO 97/41720 | 11/1997 |
| WO | WO 00/05611 | 2/2000 |

OTHER PUBLICATIONS

Momotsu, N. et al., "Compact and Economical High-Density PLC-type Splitters," *Optoelectronics and Communications Conference, Proceedings of OECC*, vol. 2, pp. 1636-1637 (Oct. 18, 1999).
"Value-Added Module (VAM) System; Monitor, Splitter, WDM and CWDM Modules and Chassis", 4h Edition, ADC Telecommunications, Inc. © 2000, 2001, 2002, 2005, 2006, 2007, 32 pages.

* cited by examiner

*Primary Examiner* — Mark A Robinson
*Assistant Examiner* — Michael P Mooney
(74) *Attorney, Agent, or Firm* — Merchant & Gould P.C.

(57) ABSTRACT

A fiber optic module includes a housing defining an interior region. A bulkhead assembly is in engagement with the housing. The bulkhead assembly includes a plurality of input adapter ports, a plurality of output adapter ports, and a plurality of monitor ports. A high-density planar lightwave circuit chip is disposed in the interior region of the housing and includes a plurality of optical splitters.

21 Claims, 9 Drawing Sheets

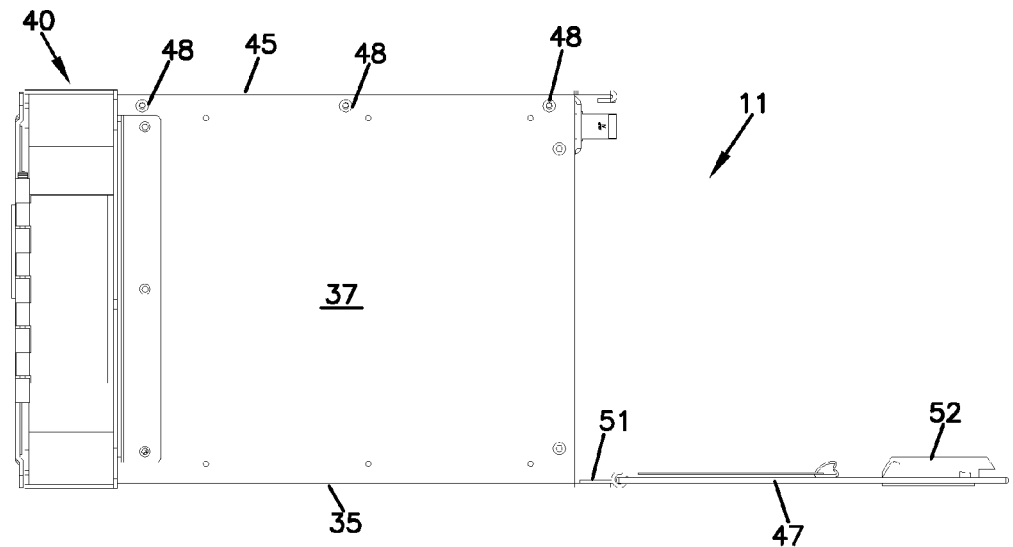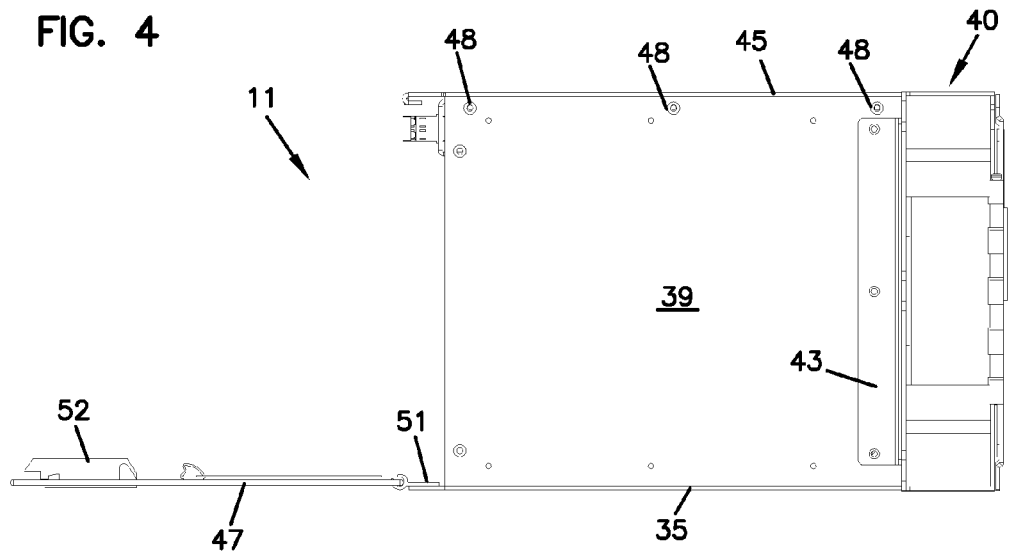

FIBER OPTIC MODULE

CROSS REFERENCE TO RELATED APPLICATIONS

The present application claims priority to U.S. Provisional Patent Application No. 60/944,016, filed Jun. 14, 2007 and entitled "Fiber Optic Module". The disclosure of which is hereby incorporated by reference in its entirety.

TECHNICAL FIELD

The present disclosure relates to fiber optic modules, and more particularly, to fiber optic modules with monitoring capabilities.

BACKGROUND

As demand for telecommunications increases, fiber optic networks are being extended in more and more areas. With the extension of optical fiber networks, there is a need for peripheral equipment that can efficiently extend the fiber optic service into areas where current and future customers are located. In addition, there is a need to detect potential fiber optic service interruptions before fiber optic service is lost.

SUMMARY

An aspect of the present disclosure relates to a fiber optic module having a housing that defines an interior region. A bulkhead assembly is in engagement with the housing and includes a plurality of input adapter ports, a plurality of output adapter ports, and a plurality of monitor ports. A high-density planar lightwave circuit chip is disposed in the interior region of the housing.

Another aspect of the present disclosure relates to a fiber optic module having a housing that defines an interior region of the housing. A bulkhead assembly is in engagement with the housing. The bulkhead assembly includes a plurality of input adapter ports, a plurality of output adapter ports, and a plurality of monitor ports. A high-density planar lightwave circuit chip is disposed in the interior region of the housing. The high-density planar lightwave circuit chip includes optical splitters that are in optical communication with the input adapter ports, the output adapter ports, and the monitor ports.

Another aspect of the present disclosure relates to a fiber optic module having a housing that defines an interior region of the housing. A bulkhead assembly is in connected engagement with the housing. The bulkhead assembly includes a plurality of input adapter ports, a plurality of output adapter ports, and a plurality of monitor ports. A high-density planar lightwave circuit chip is disposed in the interior region of the housing. The high-density planar lightwave circuit chip includes optical splitters. At least one optical flex circuit in communication with the high-density planar lightwave circuit chip and the output adapter ports and the monitor ports is disposed in the interior region.

Another aspect of the present disclosure relates to a fiber optic module having a housing defining an interior region. A bulkhead assembly is in engagement with the housing. The bulkhead assembly includes a bulkhead plate, a plurality of input adapter ports, a plurality of output adapter ports, and a plurality of monitor ports. The monitor ports are dual LC-type adapters. A high-density planar lightwave circuit chip is disposed in the interior region of the housing. The high-density planar lightwave circuit chip includes at least thirty-six optical splitters. At least one optical flex circuit in communication with the high-density planar lightwave circuit chip and the output adapter ports and the monitor ports is disposed in the interior region.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is a left side view of the fiber optic module of FIG. 2.

FIG. 4 is a right side view of the fiber optic module of FIG. 2.

DETAILED DESCRIPTION

Figure 1:
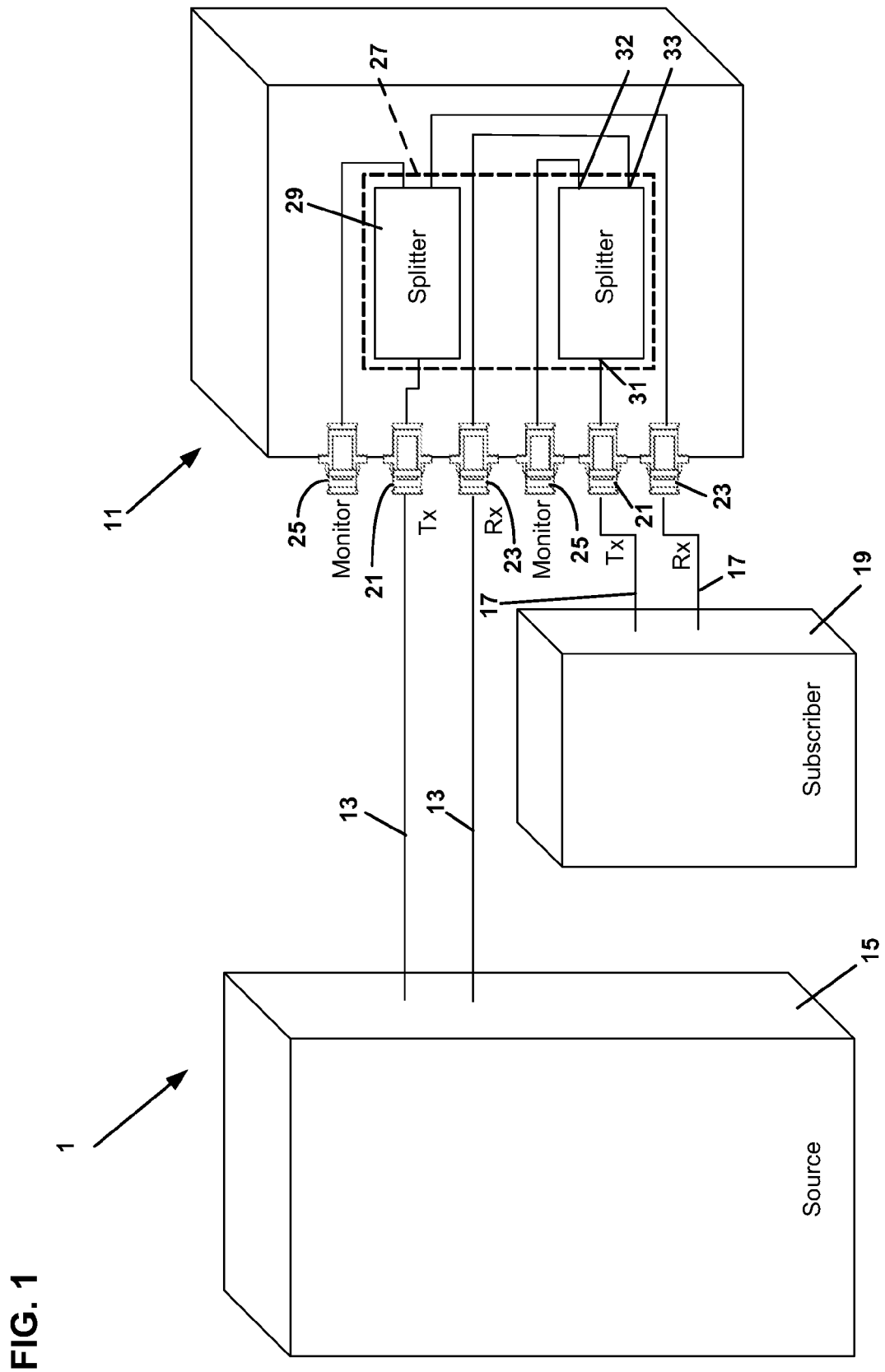
FIG. 1 is a schematic representation of a fiber optic system having features that are examples of aspects in accordance with the principles of the present disclosure.

Reference will now be made in detail to the exemplary aspects of the present disclosure that are illustrated in the accompanying drawings. Unless otherwise stated, directional references (e.g., vertical, forward, top, bottom, left, right, etc.) used herein are based on the orientation of components and assemblies shown in the drawings. Wherever possible, the same reference numbers will be used throughout the drawings to refer to the same or like structure.

Referring now to FIG. 1, a schematic representation of an exemplary fiber optic system, generally designated 1, is shown. The fiber optic system 1 includes a fiber optic module, generally designated 11. The fiber optic module 11 provides a point of connectivity between a fiber optic feeder cable 13 from a source 15 and a subscriber cable 17 from a subscriber location 19. The fiber optic module 11 includes a plurality of input adapter ports 21 and output adapter ports 23, where the input and output adapter ports 21, 23 of fiber optic module 11 are adapted to receive connectorized ends of the feeder cables 13 and the subscriber cables 17. The fiber optic module 11 also includes a plurality of monitor ports 25 that allow for localized monitoring of each feeder cable 13 and each subscriber cable 17. The monitor ports 25 provide a convenient access point from which fiber failure or fiber degradation can be evaluated. The use of monitor ports has been described in U.S. Pat. No. 5,432,875, which is hereby incorporated by reference in its entirety.

Each of the input adapter ports 21, output adapter ports 23 and monitor ports 25 is in optical communication with a high-density planar lightwave circuit chip, generally designated 27 (shown as a dashed line in FIG. 1), which will be described in greater detail subsequently. The high-density planar lightwave circuit chip 27 includes a plurality of optical splitters, generally designated 29, which will also be described in greater detail subsequently. In the subject embodiment, the optical splitters 29 are one-by-two (1×2) splitters, such that each optical splitter 29 includes an input 31, a first output 32, and a second output 33. Each input adapter port 21 is in optical communication with the input 31 of one of the optical splitters 29 while each output adapter port 23 and each monitor port 25 is in optical communication with the first and second outputs 32, 33, respectively, of one of the optical splitters 29.

Referring now to FIGS. 2-6 and 10, an exemplary embodiment of the fiber optic module 11 is shown. The fiber optic module 11 includes a housing 34 having a base 35, a first sidewall 37, which is generally perpendicular to the base 35, and a second sidewall 39, which is oppositely disposed from the first sidewall 37 and generally perpendicular to the base 35. The housing 34 of the fiber optic module 11 further includes a rear panel assembly, generally designated 40, that is in connected engagement with the first and second sidewalls 37, 39. In the subject embodiment, the rear panel assembly 40 includes a cable management portion, generally designated 41 (shown only in FIG. 10), for managing inter-facility cable that enters the fiber optic module 11 through the back side of the housing 34. The cable management portion 41 includes a plurality of fiber radius protectors 42 (shown only in FIG. 10) that are sized such that the radius of each fiber radius protector 42 is larger than the minimum bend radius of the inter-facility cable so as to prevent damage to the inter-facility cable caused by bending. In the subject embodiment, the rear panel assembly 40 is in connected engagement with the first and second sidewalls 37, 39 through brackets 43. However, it will be understood that the scope of the present disclosure is not limited to the housing 34 having a rear panel assembly 40 with the cable management portion 41 or the rear panel assembly 40 being in connected engagement with the first and second sidewalls 37, 39 through the brackets 43.

The housing 34 of the fiber optic module 11 further includes a top 45 and a front access cover 47. The top 45 of the fiber optic module 11 is disposed opposite the base 35 and is engaged with the first and second sidewalls 37, 39 through a plurality of fasteners 48 (i.e., screws, bolts, rivets, etc.).

The front access cover 47 provides selective access to a front end portion 49 of the fiber optic module 11. In the subject embodiment, the front access cover 47 is pivotally engaged with the front portion 50 of the base 35 such that the front access cover 47 is selectively moveable between an open position (shown in FIGS. 2-6) and a closed position. The pivotal engagement of the front access cover 47 is accomplished through a plurality of hinges 51. A latch 52 is disposed on the front access cover 47 for selective retention of the front access cover 47 in the closed position. In the subject embodiment, the latch 52 selectively engages the top 45.

Figure 2:
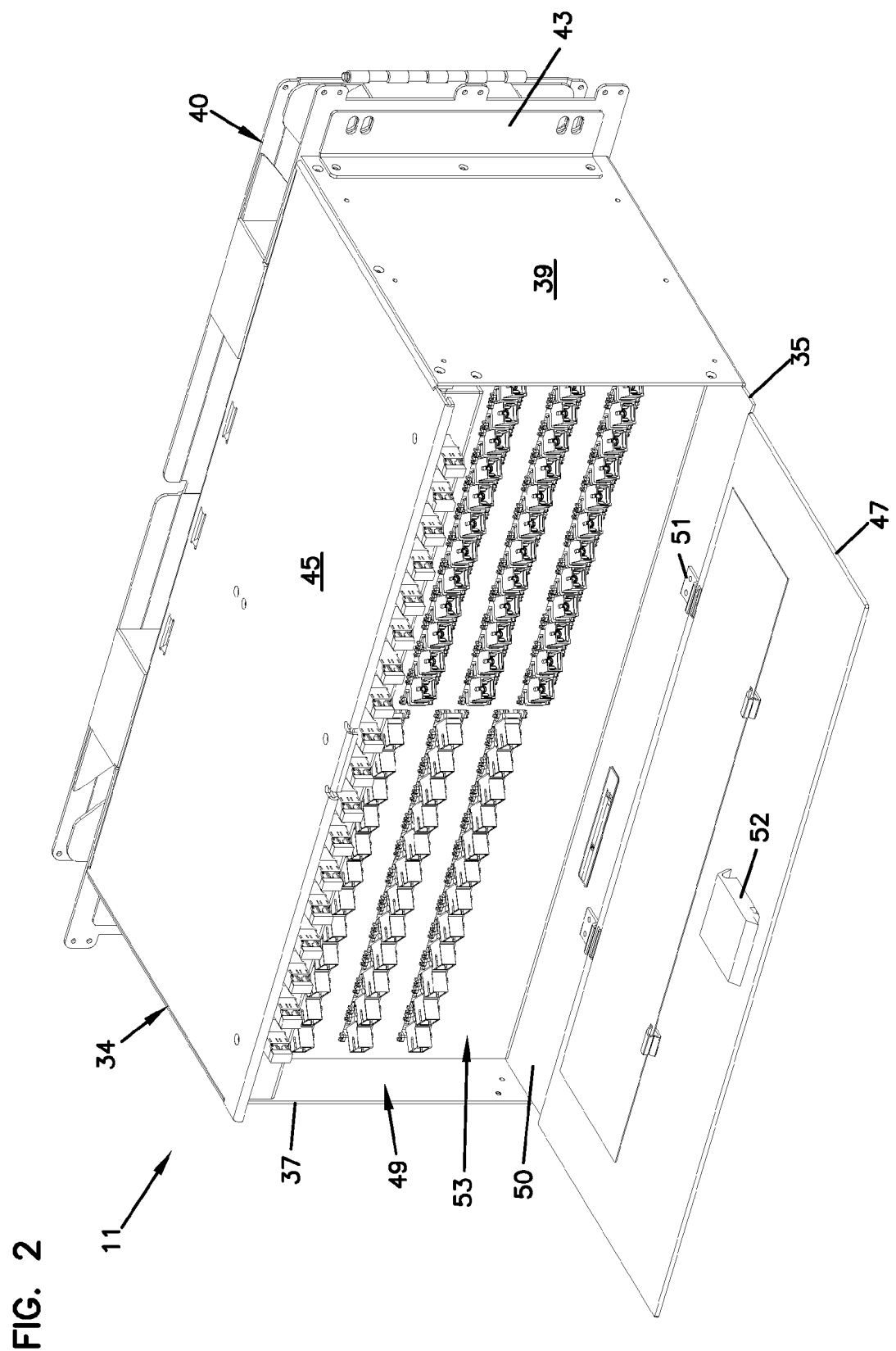
FIG. 2 is a perspective view of the fiber optic module shown schematically in FIG. 1.
Figure 5:
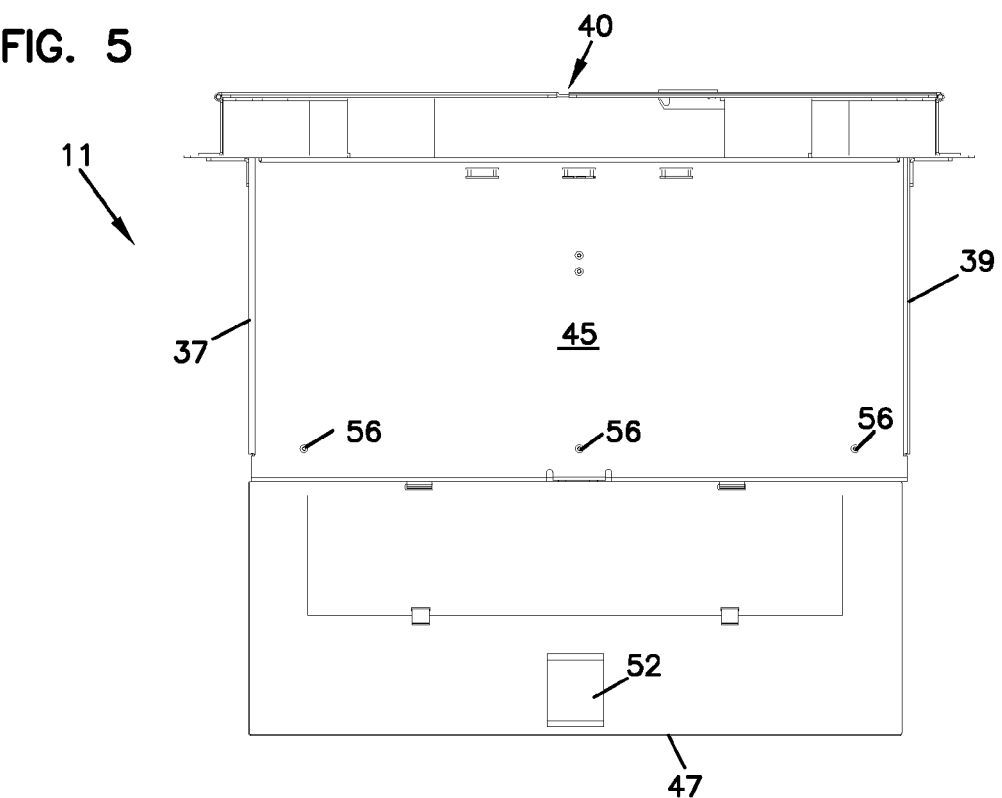
FIG. 5 is a top view of the fiber optic module of FIG. 2.
Figure 6:
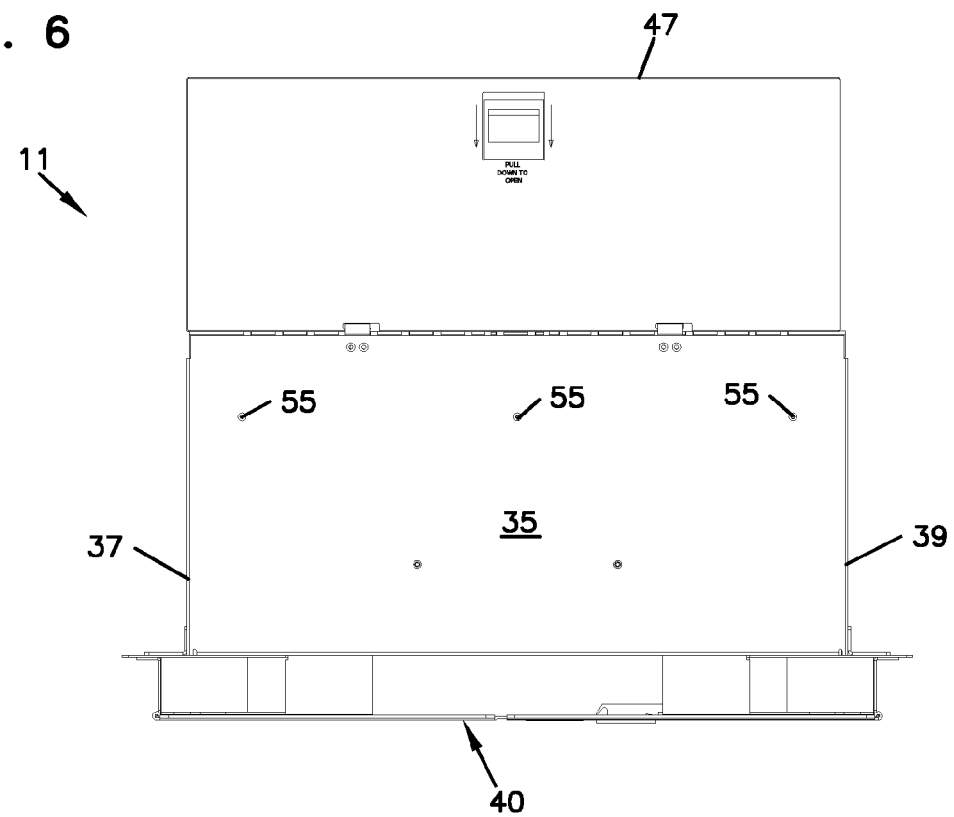
FIG. 6 is a bottom view of the fiber optic module of FIG. 2.
Figure 7:
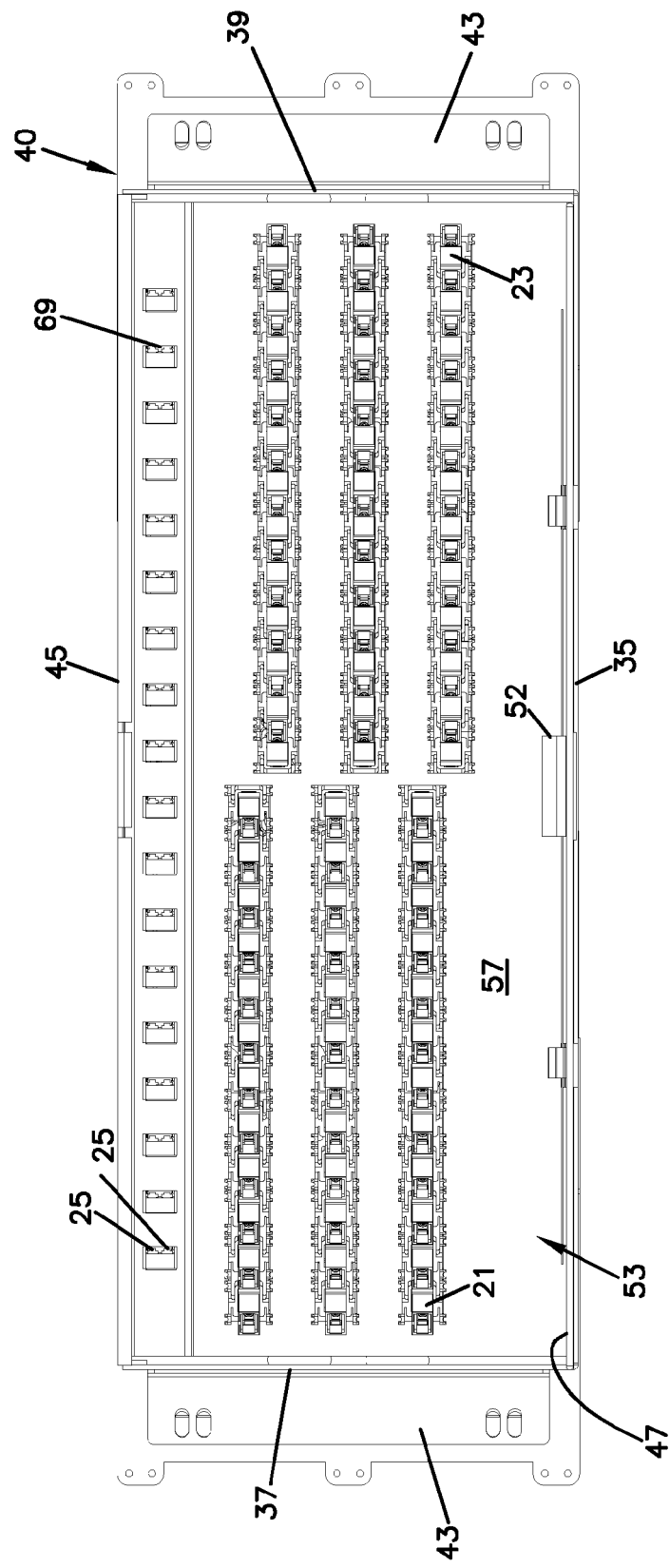
FIG. 7 is a front view of the fiber optic module of FIG. 2.

Referring now to FIGS. 2 and 7, the fiber optic module 11 further includes a bulkhead assembly, generally designated 53. The bulkhead assembly 53 is in connected engagement with the housing 34. In the subject embodiment, the bulkhead assembly 53 is disposed at the front end portion 49 of the fiber optic module 11 and is in fastened engagement with the front portion 50 of the base 35 through a plurality of fasteners 55 (shown in FIG. 6) and the top 45 through a plurality of fasteners 56 (shown in FIG. 5). It will be understood, however, that the scope of the present disclosure is not limited to the bulkhead assembly 53 being disposed at the front end portion 49 of the fiber optic module 11 or being in fastened engagement with the base 35 and the top 45. In an alternate embodiment, the bulkhead assembly 53 is in pivotal engagement with the housing 34.

Figure 8:
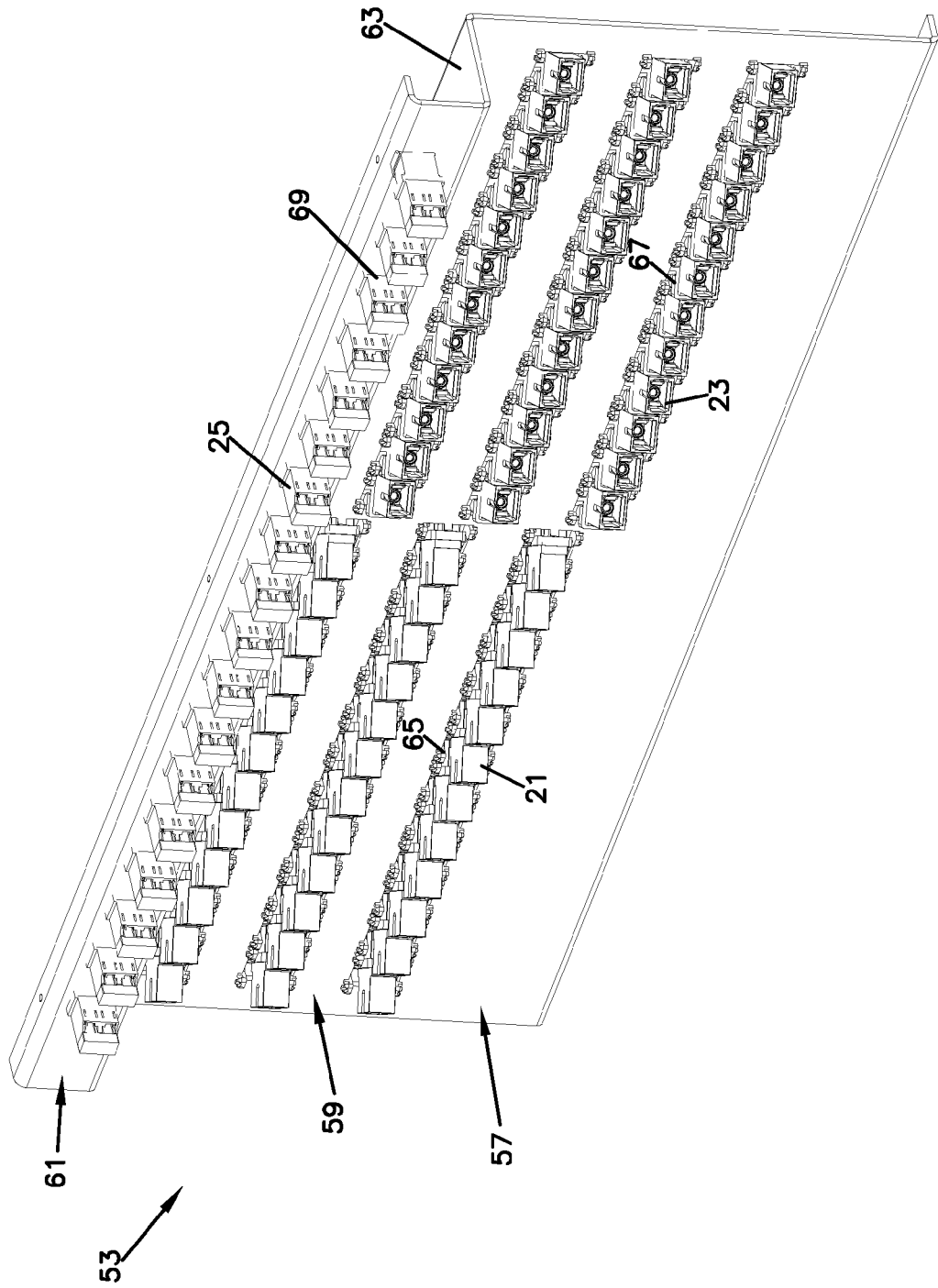
FIG. 8 is perspective view of a bulkhead assembly suitable for use in the fiber optic module of FIG. 2.
Figure 9:
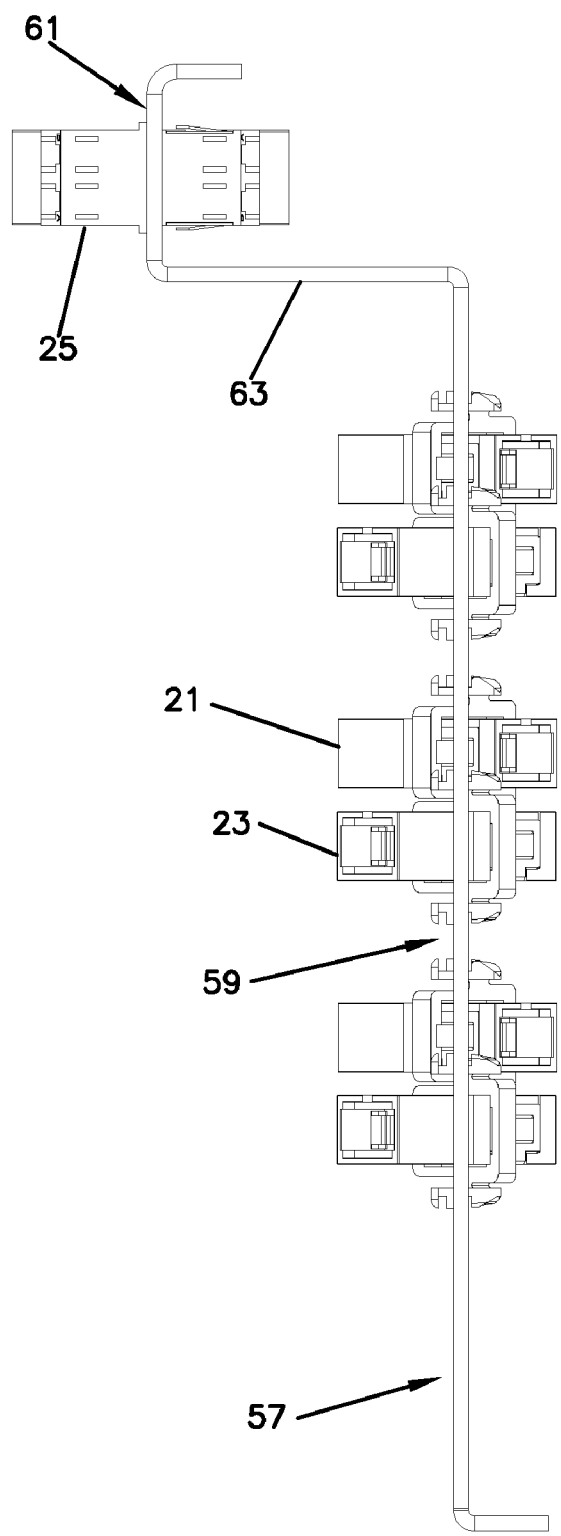
FIG. 9 is a right side view of the bulkhead assembly of FIG. 8.

Referring now to FIGS. 7-9, an exemplary embodiment of the bulkhead assembly 53 will be described. The bulkhead assembly 53 includes a bulkhead plate, generally designated 57, to which are mounted the input adapter ports 21, the output adapter ports 23, and the monitor ports 25.

In the subject embodiment, the bulkhead plate 57 has a first portion, generally designated 59, and a second portion, generally designated 61. The second portion 61 is offset from the first portion 59 such that the second portion 61 extends outwardly from the first portion 59. In the subject embodiment, the second portion 61 is generally parallel to the first portion 59. A step 63 connects the first and second portions 59, 61. The first portion 59 of the bulkhead plate 57 defines a plurality of input slots 65 and a plurality of output slots 67. In the subject embodiment, and by way of example only, there are three input slots 65 and three output slots 67 defined by the bulkhead plate 57. In an alternate embodiment, and by way of example only, there are four input slots 65 and four output slots 67. In another alternate embodiment, and by way of example only, there are six input slots 65 and six output slots 67.

The input slots 65 are oriented on the left side (with respect to FIG. 7) of the bulkhead plate 57 such that the input slots 65 are vertically aligned. It will be understood, however, that the scope of the present disclosure is not limited to the input slots 65 being disposed on the left side of the bulkhead plate 57 or being vertically aligned. The output slots 67 are oriented on the right side (with respect to FIG. 7) of the bulkhead plate 57 such that the output slots 67 are vertically aligned. It will be understood, however, that the scope of the present disclosure is not limited to the output slots 67 being disposed on the right side of the bulkhead plate 57 or being vertically aligned. The input slots 65 on the left side of the bulkhead plate 57 are vertically offset from the output slots 67 on the right side of the bulkhead plate 57. It will be understood, however, that the scope of the present disclosure is not limited to the input slots 65 being vertically offset from the output slots 67.

Input adapter ports 21 are mounted in each input slot 65. In the subject embodiment, the input adapter ports 21 are mounted in each input slot 65 such that the input adapter ports 21 are at an oblique angle with respect to the bulkhead plate 57. In one embodiment, the input adapter ports 21 are mounted in angled retainers, which are mounted in the input slots 65. The angled retainers have angled mounting surfaces that provide the oblique angle between the input adapter ports 21 and the bulkhead plate 57. It will be understood, however, that the scope of the present disclosure is not limited to the input adapter ports 21 being mounted in the input slot 65 such that the input adapter ports 21 are at an oblique angle with the bulkhead plate 57. In the subject embodiment, and by way of example only, twelve input adapter ports 21 are mounted in each input slot 65. Therefore, in the subject embodiment in which there are three input slots 65 with twelve input adapter ports 21 per input slot 65, there are thirty-six input adapter ports 21 on the bulkhead assembly 53. In the embodiment in which there are four input slots 65 with twelve input adapter ports 21 per input slot 65, there are forty-eight input adapter ports 21 on the bulkhead assembly 53. In the embodiment in which there are six input slots 65 with twelve input adapter ports 21 per input slot 65, there are seventy-two input adapter ports 21 on the bulkhead assembly 53. In a preferred embodiment, the input adapter ports 21 are FC adapters, ST adapters, SC adapters, or LX.5 adapters. Although, it will be understood that the present disclosure is not limited to the input adapter ports 21 being FC, ST, SC, or LX.5 adapters.

Output adapter ports 23 are mounted in each output slot 67. In the subject embodiment, the output adapter ports 23 are mounted in each output slot 67 such that the output adapter ports 23 are at an oblique angle with respect to the bulkhead plate 57. In one embodiment, the output adapter ports 23 are mounted in angled retainers that are mounted in the output slots 67. The angled retainers provide the oblique angle between the output adapter ports 23 and the bulkhead plate 57. It will be understood, however, that the scope of the present disclosure is not limited to the output adapter ports 23 being mounted in the output slot 67 such that the output adapter ports 23 are at an oblique angle with the bulkhead plate 57. In the subject embodiment, and by way of example only, twelve output adapter ports 23 are mounted in each output slot 67. Therefore, in the subject embodiment in which there are three output slots 67 with twelve output adapter ports 23 per output slot 67, there are thirty-six output adapter ports 23 on the bulkhead assembly 53. In the embodiment in which there are four output slots 67 with twelve output adapter ports 23 per output slot 67, there are forty-eight output adapter ports 23 on the bulkhead assembly 53. In the embodiment in which there are six output slots 67 with twelve output adapter ports 23 per output slot 67, there are seventy-two output adapter ports 23 on the bulkhead assembly 53. In a preferred embodiment, the output adapter ports 23 are FC adapters, ST adapters, SC, or LX.5 adapters. Although, it will be understood that the present disclosure is not limited to the output adapter ports 23 being FC, ST, SC, or LX.5 adapters.

Referring still to FIGS. 2 and 7-9, the second portion 61 of the bulkhead plate 57 defines a plurality of monitor port openings 69. In the subject embodiment, the monitor port openings 69 are horizontally aligned (with respect to FIG. 7) along the second portion 61 of the bulkhead plate 57. It will be understood, however, that the scope of the present disclosure is not limited to the monitor port openings 69 being horizontally aligned along the second portion of the bulkhead plate 57. Monitor ports 25 are mounted in each monitor port opening 69. In the subject embodiment, the total number of monitor ports 25 disposed in the second portion 61 of the bulkhead plate 57 corresponds to the total number of output adapter ports 23 disposed in first portion 59. In the subject embodiment, and by way of example only, thirty-six output adapter ports 23 are mounted to the bulkhead plate 57. Therefore, in the subject embodiment, and by way of example only, thirty-six monitor ports 25 are mounted to the second portion 61 of the bulkhead plate 57. In the embodiment in which there are forty-eight output adapter ports 23 mounted to the bulkhead plate 57, there are forty-eight monitor ports 25 mounted to the second portion 61 of the bulkhead plate 57. In the embodiment in which there are seventy-two output adapter ports 23 mounted to the bulkhead plate 57, there are seventy-two monitor ports 25 mounted to the second portion 61 of the bulkhead plate 57. In a preferred embodiment, the monitor ports 25 are dual LC-type adapters, which allow for two monitor ports 25 to be disposed in each monitor port opening 69. Therefore, in a preferred embodiment, the total number of monitor port openings 69 defined by the bulkhead plate 57 corresponds to one-half of the total number of output adapter ports 23 disposed in the bulkhead plate 57. It will be understood, however, that the scope of the present disclosure is not limited to the monitor ports 25 being dual LC-type adapters.

In the subject embodiment, the second portion 61 of the bulkhead plate 57 is offset from the first portion 59 such that the second portion 61 is disposed closer to an edge 71 of the housing 34. As the monitor ports 25 are mounted to the second portion 61 of the bulkhead plate 57, the disposition of the second portion 61 of the bulkhead plate 57 closer to the edge 71 provides greater ease of access to the monitor ports 25.

Figure 10:
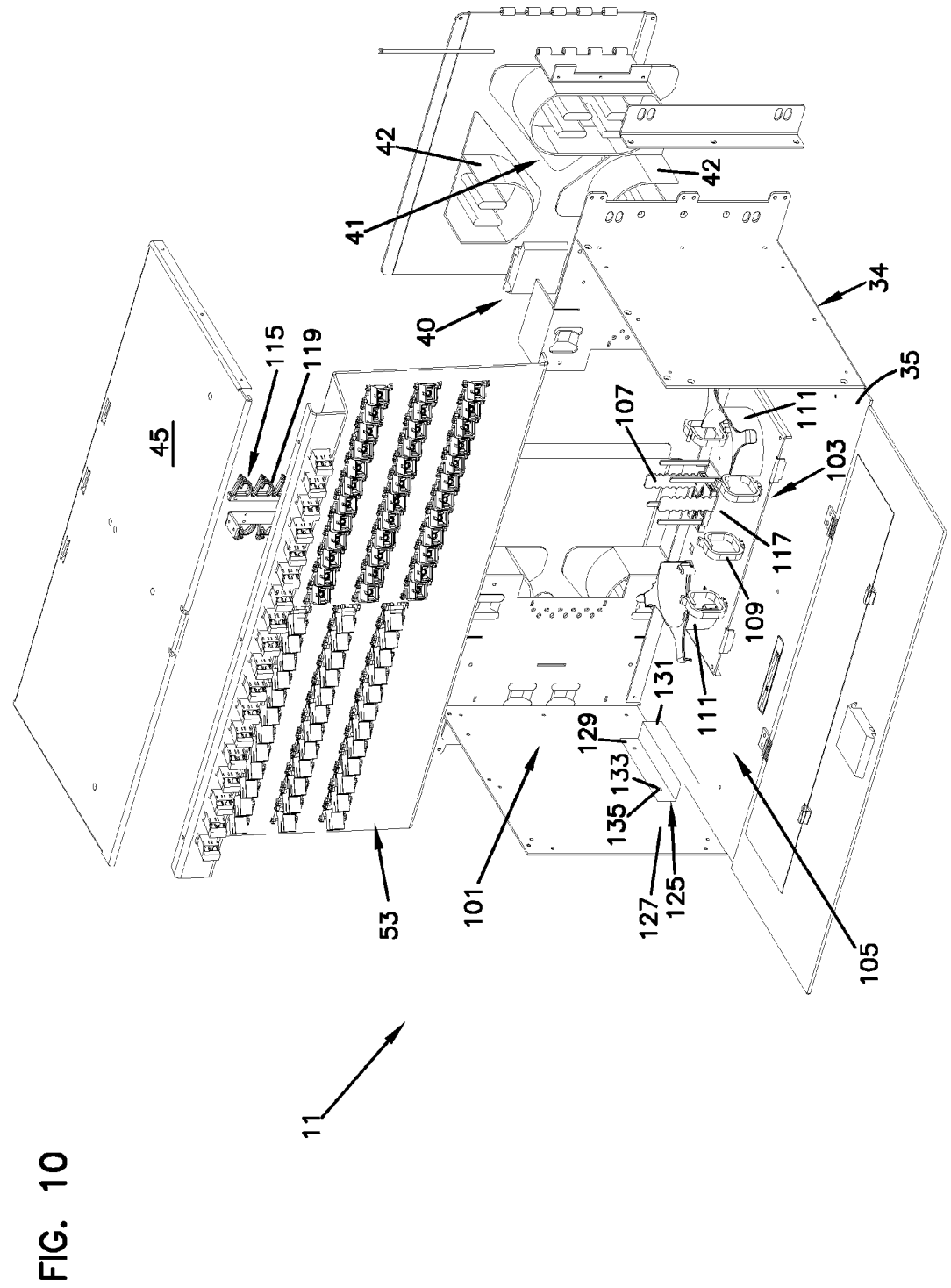
FIG. 10 is an exploded perspective view of the fiber optic module of FIG. 2.

Referring now to FIG. 10, the base 35, the first and second sidewalls 37, 39, the rear panel assembly 40, and the bulkhead assembly 53 define an interior region, generally designated 101, of the fiber optic module 11. The interior region 101 includes a cable management tray, generally designated 103, and a PLC mounting area 105.

The cable management tray 103 provides storage for excess optical fibers that are routed in the interior region 101 of the fiber optic module 11. In the subject embodiment, the cable management tray 103 includes a fanout holder 107, cable clips 109, and bend radius protectors 111. In the subject embodiment, a fiber tree, generally designated 115, is mounted to the top 45 of the fiber optic module 11 and extends toward a central region 117 of the cable management tray 103. The fiber tree 115 includes a plurality of openings 119.

The PLC mounting area 105 is an area in the interior region 101 of the fiber optic module 11 for mounting the high-density planar lightwave circuit (PLC) chip 27. A retainer, generally designated 125, is mounted to a mounting surface 127 in the PLC mounting area 105 of the fiber optic module 11 for retaining the high-density PLC chip 27. In the subject embodiment, the mounting surface 127 is the first sidewall 37. It will be understood, however, that the scope of the present disclosure is not limited to the retainer 125 being mounted to the first sidewall 37. In the subject embodiment, the retainer 125 is a retention bracket having a first section 129 and a second section 131. The first portion of the retention bracket 125 includes a plurality of mounting openings 133 that align with corresponding mounting openings in the mounting surface 127. In the subject embodiment, the retention bracket 125 is in fastened engagement with the mounting surface 127 through a plurality of fasteners 135.

In the subject embodiment, the second section 131 of the retention bracket 125 is offset from the first section 129. The offset of the second section 131 is such that the high-density PLC chip 27 can be disposed between the second section 131 and the mounting surface 127 when the first section 129 is mounted to the mounting surface 127. In a preferred embodiment, the second section 131 includes a compressible material disposed on the side of the retention bracket 125 facing the mounting surface 127. The compressible material provides protection to the high-density PLC chip 27 from inadvertent damage.

Figure 11:
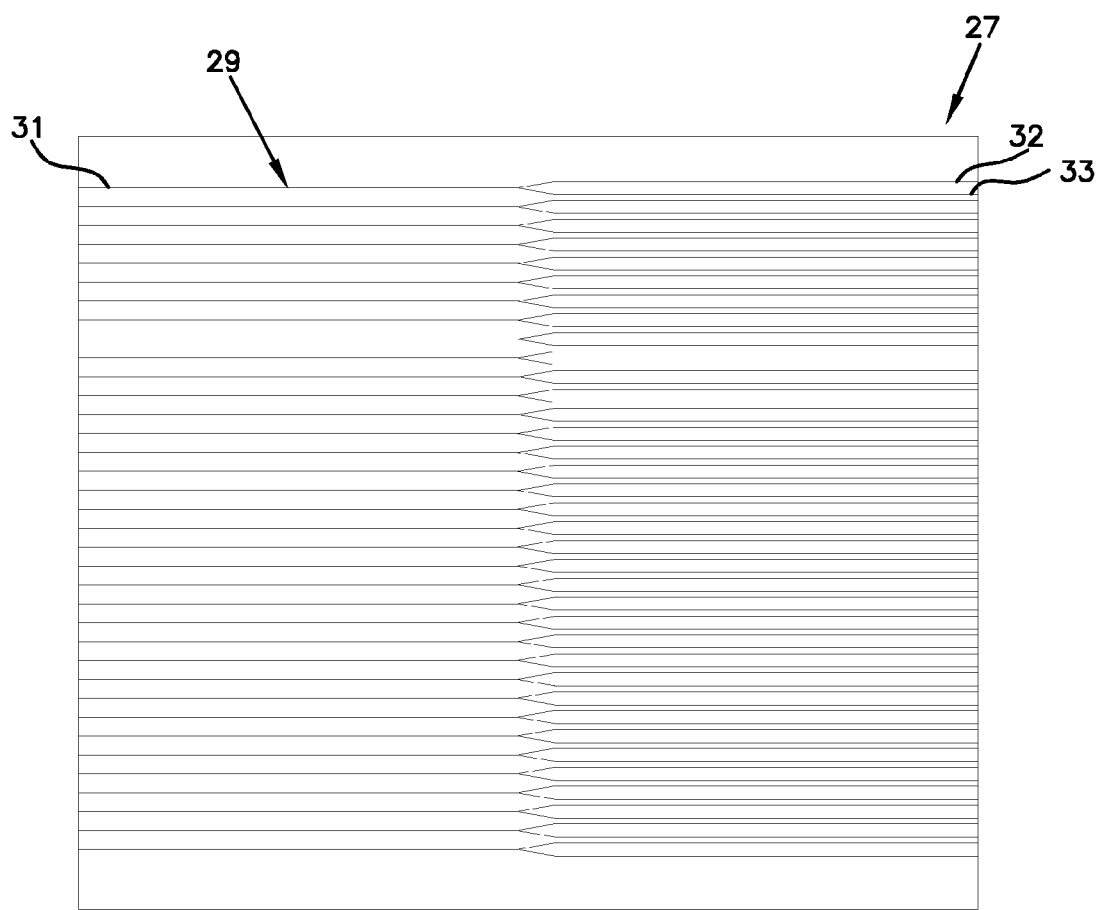
FIG. 11 is a schematic representation of a high-density planar lightwave circuit chip suitable for use in the fiber optic module of FIG. 2.

Referring now to FIG. 11, a schematic representation of the high-density PLC chip 27 is shown. The high-density PLC chip 27 includes the plurality of one-by-two (1×2) optical splitters 29, such that in one embodiment the total number of optical splitters 29 is at least thirty-six. In another embodiment, the total number of optical splitters 29 is at least forty-eight. In another embodiment, the total number of optical splitters 29 is at least seventy-two. In a preferred embodiment, the total number of optical splitters 29 is equivalent to the number of input adapter ports 21 on the bulkhead assembly 53. Each of optical splitters 29 includes the input 31 and the first and second outputs 32, 33. Each of the optical splitters 29 splits the optical signal received at the input 31 such that a portion of the optical signal is transmitted to the first output 32 and the remaining portion of the optical signal is transmitted to the second output 33. In a preferred embodiment, the optical splitter 29 is a 90/10 splitter, which splits the optical signal received at the input 31 such that 90% of the optical signal is transmitted to the first output 32 and 10% is transmitted to the second output 33. It will be understood, however, that the scope of the present disclosure is not limited to the optical splitter 29 being a 90/10 splitter.

Referring now to FIGS. 10 and 11, an exemplary internal cable routing scheme for the fiber optic module 11 will be described. For ease of description, the internal cable routing scheme will be described as having a first ribbon cable and a second ribbon cable. It will be understood, however, that the scope of the present disclosure is limited to neither the use of ribbon cables nor the use of only a first and second ribbon cable.

A first ribbon cable is in connected engagement with the backside of the input adapter ports 21. The first ribbon cable is routed to the high-density PLC chip 27 such that each optical fiber in the ribbon cable is in optical connection with one input 31 of one of the optical splitters 29 in the high-density PLC chip 27. Each of the first and second outputs 32, 33 of the high-density PLC chip 27 are in optical connection with each optical fiber of a second ribbon cable. The second ribbon cable is routed to a fanout in the fanout holder 107 on the cable management tray 103. At the fanout, the optical fibers of the second ribbon cable are "fanned out" or separated from each other. After the fanout, the optical fibers pass through the cable clips 109, which assist in retaining the optical fibers in a loop formation, and around the bend radius protectors 111. The bend radius protectors 111 are sized such that the radius of each bend radius protector 111 is larger than the minimum bend radius of the optical fiber so as to prevent damage to the optical fiber caused by bending.

Ends of the optical fibers are then passed through the openings 119 in the fiber tree 115 and routed to the backside of the output adapter ports 23 and the monitor ports 25. Each of the ends of the optical fibers that are in optical connection with the first output 32 of the optical splitter 29 is connected to the backside of one of the output adapter ports 23 while each of the ends of the optical fibers that are in optical connection with the second output 33 of the optical splitter 29 is connected to the backside of one of the monitor ports 25. In the one embodiment, the ends of the optical fibers are in optical connection with connectors (i.e., FC, ST, SC, LX.5, etc.).

In an alternate embodiment of the cable routing scheme, a first ribbon cable is in connected engagement with the backside of the input adapter ports 21. The first ribbon cable is routed to the high-density PLC chip 27 such that each optical fiber in the ribbon cable is in optical connection with one input 31 of one of the optical splitters 29 in the high-density PLC chip 27. Each of the first and second outputs 32, 33 of the high-density PLC chip 27 are in optical connection with each optical fiber in optical connection with an optical flex circuit. The optical flex-circuit provides a compact cable management system for the optical fibers. The optical flex circuit includes a plurality of optical fibers disposed between flexible polymeric sheets of material (e.g., MYLAR®, etc.). In one embodiment, the flexible polymeric sheets have a thickness of less than or equal to about 8 mils. In another embodiment, the flexible polymeric sheets have a thickness of greater than or equal to about 6 mils. In one embodiment, the optical flex circuit is used instead of the cable management tray 103. In another embodiment, the optical flex circuit is used in conjunction with the cable management tray 103.

Each connectorized end of the optical fibers that are in optical connection with the first output 32 of the optical splitter 29 is connected to the backside of one of the output adapter ports 23 while each of the connectorized ends of the optical fibers that are in optical connection with the second output 33 of the optical splitter 29 is connected to the backside of one of the monitor ports 25.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic module comprising:
   a housing defining an interior region;
   a bulkhead assembly in engagement with the housing, wherein the bulkhead assembly includes:
      a bulkhead plate having a first portion and a second portion, the first portion defining a plurality of input slots and a plurality of output slots, the second portion defining a plurality of monitor port openings, the second portion being offset from the first portion and generally parallel to the first portion;
      a plurality of input adapter ports mounted in the input slots of the first portion of the bulkhead plate;
      a plurality of output adapter ports mounted in the output slots of the first portion of the bulkhead plate; and
      a plurality of monitor ports mounted in the monitor port openings of the second portion of the bulkhead plate, wherein only monitor ports are disposed in the second portion of the bulkhead plate; and
   a high-density planar lightwave circuit chip disposed in the interior region of the housing, the high-density planar lightwave circuit chip including optical splitters that are in optical communication with the input adapter ports, the output adapter ports, and the monitor ports.

2. A fiber optic module as claimed in claim 1, wherein the number of optical splitters in the high-density planar lightwave circuit chip is at least thirty-six.

3. A fiber optic module as claimed in claim 1, wherein the optical splitters are 90/10 splitters.

4. A fiber optic module as claimed in claim 1, wherein the number of optical splitters in the high-density planar lightwave circuit chip is at least forty-eight.

5. A fiber optic module as claimed in claim 1, further comprising at least one optical flex circuit disposed in the interior region of the housing, wherein the optical flex circuit is in optical communication with the high-density planar lightwave circuit chip and the output adapter ports and the monitor ports.

6. A fiber optic module as claimed in claim 1, further comprising a cable management tray disposed in the interior region of the housing, wherein the cable management tray includes a fanout holder, a plurality of cable clips, and bend radius protectors.

7. A fiber optic module as claimed in claim 1, wherein the input adapter ports are mounted in angled retainers that are mounted in the input slots and the output adapter ports are mounted in angled retainers that are mounted in the output slots.

8. A fiber optic module as claimed in claim 1, wherein the monitor ports are dual LC-type adapters.

9. A fiber optic module as claimed in claim 1, wherein input adapter ports and the output adapter ports are adapters selected from the group consisting of FC, ST, SC, LX.5 adapters and combinations thereof.

10. A fiber optic module as claimed in claim 1, wherein the housing includes a front access cover that is selectively moveable between an open position and a closed position.

11. A fiber optic module as claimed in claim 10, wherein the front access cover is pivotally engaged with the base.

12. A fiber optic module comprising:
a housing including a base, a top disposed opposite the base and a first sidewall that extends between the base and the top and an oppositely disposed second sidewall that extends between the base and the top, the housing having a front end and defining an interior region;
a front access cover disposed at the front end of the housing;
a bulkhead assembly in connected engagement with the housing, wherein the bulkhead assembly includes:
   a bulkhead plate having a first portion and a second portion, the first portion defining a plurality of input slots and a plurality of output slots, the second portion defining a plurality of monitor port openings, the second portion being generally parallel to the first portion and offset from the first portion so that the second portion is closer to the front end of the housing than the first portion;
   a plurality of input adapter ports mounted in the input slots of the first portion of the bulkhead plate;
   a plurality of output adapter ports mounted in the output slots of the first portion of the bulkhead plate; and
   a plurality of monitor ports mounted in the monitor port openings of the second portion of the bulkhead plate;
a high-density planar lightwave circuit chip disposed in the interior region of the housing, wherein the high-density planar lightwave circuit chip includes a plurality of optical splitters; and
at least one optical flex circuit disposed in the interior region, wherein the optical flex circuit is in optical communication with the high-density planar lightwave circuit chip and the output adapter ports and the monitor ports.

13. A fiber optic module as claimed in claim 12, wherein the high-density planar lightwave circuit chip includes at least thirty-six optical splitters.

14. A fiber optic module as claimed in claim 13, wherein the input adapter ports and output adapter ports are adapters selected from the group consisting of FC, ST, SC, LX.5 adapters and combinations thereof.

15. A fiber optic module as claimed in claim 14, wherein the monitor ports are dual LC-type adapters.

16. A fiber optic module comprising:
a housing defining an interior region;
a bulkhead assembly in engagement with the housing, the bulkhead assembly including:
   a bulkhead plate having a first portion and a second portion, the first portion defining a plurality of input slots and a plurality of output slots, the second portion defining a plurality of monitor port openings, the second portion being offset from the first portion and generally parallel to the first portion;
   a plurality of input adapter ports mounted in the input slots of the first portion of the bulkhead plate;
   a plurality of output adapter ports mounted in the output slots of the first portion of the bulkhead plate; and
   a plurality of monitor ports mounted in the monitor port openings of the second portion of the bulkhead plate, wherein the monitor ports are dual LC-type adapters and only monitor ports are disposed in the second portion of the bulkhead plate;
a high-density planar lightwave circuit chip disposed in the interior region of the housing, wherein the high-density planar lightwave circuit chip includes at least thirty-six optical splitters; and
at least one optical flex circuit disposed in the interior region, wherein the optical flex circuit is in optical communication with the high-density planar lightwave circuit chip and the output adapter ports and the monitor ports.

17. A fiber optic module as claimed in claim 16, wherein the input adapter ports and the output adapter ports are disposed at an oblique angle with respect to the bulkhead plate.

18. A fiber optic module comprising:
a housing defining an interior region;
a bulkhead assembly in engagement with the housing, the bulkhead assembly including:
   a bulkhead plate having a first portion and a second portion, the first portion having a first side and a second side, the first side defining a plurality of input slots, the second side defining a plurality of output slots, the second portion defining a plurality of monitor port openings, the second portion being offset from the first portion and generally parallel to the first portion;
   a plurality of input adapter ports mounted in the input slots of the first side of the first portion of the bulkhead plate and only input adapter ports are disposed in the first side of the first portion of the bulkhead plate, wherein the input adapter ports are disposed at a first oblique angle with respect to the bulkhead plate;
   a plurality of output adapter ports mounted in the output slots of the second side of the first portion of the bulkhead plate and only output adapter ports are disposed in the second side of the first portion of the bulkhead plate, wherein the output adapter ports are disposed at a second oblique angle with respect to the bulkhead plate; and
   a plurality of monitor ports mounted in the monitor port openings of the second portion of the bulkhead plate and only monitor ports are disposed in the second portion of the bulkhead plate;
a high-density planar lightwave circuit chip disposed in the interior region of the housing, wherein the high-density planar lightwave circuit chip includes at least thirty-six optical splitters.

19. A fiber optic module as claimed in claim 18, wherein the input slots are vertically offset from the output slots.

20. A fiber optic module as claimed in claim 18, wherein the plurality of input adapter ports is disposed in a plurality of rows in the first side of the first portion of the bulkhead plate and the plurality of output adapter ports is disposed in a plurality of rows in the second side of the first portion of the bulkhead plate.

21. A fiber optic module as claimed in claim 20, wherein the plurality of monitor ports is disposed in a single row in the second portion of the bulkhead plate.

* * * * *